United States Patent Office 2,975,145
Patented Mar. 14, 1961

2,975,145

SEMI-CONDUCTIVE CERAMIC COMPOSITION

Robert C. Harris, Unadilla, N.Y., assignor to The Bendix Corporation, a corporation of Delaware No Drawing. Filed Apr. 16, 1958, Ser. No. 728,803

7 Claims. (Cl. 252—521)

This invention relates to an improved electrically semi-conductive ceramic composition and to a ceramic body made thereof.

The invention has among its objects the provision of an improved electrically semi-conductive ceramic body having desirable electrical resistance properties and a high resistance to surface erosion.

Another object of the invention is the provision of a novel improved electrically semi-conductive ceramic body having appreciable thickness, substantially homogeneous composition and structure, and good mechanical strength at elevated temperature.

Still another object is the provision of a novel ceramic body of the character indicated having low porosity and low gaseous and liquid absorption properties.

A further object is the provision of an electrically semi-conductive ceramic body possessing good thermal shock resistance, good stability, and substantially constant electrical properties over long periods of use at elevated temperatures.

Yet another object is the provision of a simple economical method of making the ceramic body of the invention.

The above and further objects and novel features of the invention will more fully appear from the following description.

The ceramic body of the invention is of advantage when embodied in a spark plug, as to supply periodic sparks to a cylinder of a piston engine, or to supply a starting spark for a turbine or jet engine. In such application, the electrically semi-conductive ceramic body of the invention is positioned close to the spark gap of the spark plug, and is connected in shunt with the electrodes of the gap. A shunted spark discharge device of this type is shown in Tognola Patent No. 2,684,665. The ceramic body of the present invention is an improvement upon those disclosed in the Tognola patent insofar as its strength, low porosity, mechanical stability under heat, erosion resistance, and electrical resistance properties are concerned, and the method of the present invention produces more uniform ceramic bodies with properties which are easily reproducible.

The composition of the present invention is composed essentially of a mixture of cuprous oxide ($Cu_2O$), iron oxide ($Fe_2O_3$), alumina ($Al_2O_3$), calcium oxide (CaO), and silica ($SiO_2$). The ceramic body is produced by pressure molding such mixture and firing it to produce a strong, dense ceramic body.

The composition of the present invention lies within the following limits:

| | By weight |
|---|---|
| $Cu_2O$ | 10–35 |
| $Fe_2O_3$ | 0.5–10.0 |
| $Al_2O_3$ | 55–85 |
| CaO | 1.5–6 |
| $SiO_2$ | 1.5–6 |

Generally speaking, the higher the $Al_2O_3$ content within the above range, the higher the strength of the fired ceramic body and the electrical resistance thereof. As indicated below, CaO and $SiO_2$ are preferably employed on an equi-molecular basis. When $CaO \cdot SiO_2$ is increased in quantity in the mixture, the resistance of the resulting fixed ceramic body is increased, and the maturing temperature of the body is lowered. An increase in the $Cu_2O$ content of the body increases its conductivity and lowers the strength of the body. When $Fe_2O_3$ is increased within the above range, the electrical conductivity of the fired ceramic body is increased, the strength of the body is increased, and the maturing temperature of the body is decreased.

Within the above composition range it is usually preferred, for the above reasons, to employ compositions coming within the following somewhat narrower ranges:

| | By weight |
|---|---|
| $Cu_2O$ | 10–20 |
| $Fe_2O_3$ | 1–7 |
| $Al_2O_3$ | 65–80 |
| CaO | 2.5–5 |
| $SiO_2$ | 2.5–5 |

As indicated, CaO and $SiO_2$ are preferably employed on an equi-molecular basis. Preferably the CaO and $SiO_2$ are supplied to the mixture in the form of wallastonite, an inorganic mineral of theoretical composition $CaO \cdot SiO_2$ (48.3% CaO, 51.7% $SiO_2$). While it may be synthesized, if desired, the preferred practice would normally be to use one of the several grades of the natural mineral commercially available. A typical commercial wollastonite from New York state as used in this description contains upwards of 95% wollastonite mineral, and has a characteristic chemical composition as follows:

| | Percent | | Percent |
|---|---|---|---|
| $SiO_2$ | 49.11 | $MnO_2$ | 0.65 |
| CaO | 46.55 | BaO | 0.079 |
| $Al_2O_3$ | 1.34 | MgO | 0.96 |
| $Fe_2O_3$ | 0.48 | SiO | 0.38 |
| $V_2O_3$ | 0.94 | $H_2O$ | 0.69 |
| $TiO_2$ | 0.56 | $CO_2$ | 0.47 |

The following Table I gives the composition of four typical ceramic mixtures coming within the scope of the present invention. The first of such compositions, designated A, is that which is presently preferred:

TABLE I

| | Composition, percent by weight | | | |
|---|---|---|---|---|
| | A | B | C | D |
| $Cu_2O$ | 18.4 | 13.6 | 10.2 | 10.2 |
| $Fe_2O_3$ | 1.6 | 6.4 | 4.8 | 4.8 |
| $Al_2O_3$ | 72.0 | 72.0 | 76.5 | 79.9 |
| Wollastonite | 8.0 | 8.0 | 8.5 | 5.1 |

The following method of making ceramic bodies in accordance with the present invention is described specifically in connection with the making of preferred composition and body A. It will be understood, however, that such method is equally applicable to the making of bodies B, C, and D, and with appropriate changes in firing procedure, as above indicated, to the making of any of the compositions and bodies within the scope of the invention.

A mixture of ceramic materials was made to form the composition A, above. The $Cu_2O$ and $Fe_2O_3$ were of reagent grade, the $Al_2O_3$ was that designated E–67, sold by the Norton Company, and the wollastonite was that designated C–1, sold by Godfrey Cabot, Inc. The moisture content of the raw materials was adjusted when necessary so that it was less than 0.2%.

The ceramic raw materials were milled in a porcelain ball mill employing porcelain balls or slugs. To the ceramic materials were added:

Carbowax 4000, equal to 8% of the total weight of the ceramic batch,

Ionol, equal to 0.5% of the total weight of the ceramic batch,

Calgon, equal to 0.1% of the total weight of the ceramic batch, and

Distilled water, equal to 66.6% of the total weight of the ceramic batch.

Carbowax 4000 is a non-volatile, solid polyethylene glycol soluble in both water and aromatic hydrocarbons. The aqueous solution of such material possesses bonding and surface-active properties.

Ionol is a non-staining and non-coloring antioxidant consisting of a tri-substituted phenol in the form of pale yellow crystals; such material is insoluble in water, but is soluble in most hydrocarbon systems.

Calgon is the trade name of a commercially available sodium phosphate compound. Such compound is used here as a deflocculating agent.

The thus formed mixture was milled for 4 hours, and the milled batch was then poured into a clean pan through a screen to remove the mill slugs or balls. The pan and the contained batch were then oven dried at 200° F. until drying cracks appeared in the surface of the material (about 15 hours). The batch was then broken up, and drying continued until the batch moisture content was less than 1.0%. Excessive drying of the batch is to be avoided to prevent deterioration of the carbowax. The batch was then granulated by forcing the batch through a 20 mesh screen. If necessary to reduce its moisture content to less than 0.25%, the granulated batch is again placed in a 200° F. oven and further dried for a long enough time to dry it to such moisture content.

The thus treated batch was then dry pressed at 5,000 p.s.i. in a suitable mold. The pressed parts were fired in a gas heated kiln at a gradually increasing rate until pyrometric cone 12 bends to a 6 o'clock position (2400–2500° F.). In accordance with preferred practice the firing of the kiln was controlled so that the $CO_2$ content of the flue gases was 10 to 13% at 2000±200° F.

The following is the firing schedule employed:

| Hours | Temp., degrees F. | Hours | Temp., degrees F. |
|---|---|---|---|
| 0 | start. | 4½ | 1,400. |
| ½ | 300±100. | 5 | 1,600. |
| 1 | 400. | 5½ | 1,800. |
| 1½ | 500. | 6 | 2,000. |
| 2 | 600. | 6½ | 2,100. |
| 2½ | 700. | 7 | 2,200. |
| 3 | 800. | 7½ | 2,300. |
| 3½ | 1,000. | 8 | 2,400 } cone 12, end point. |
| 4 | 1,200. | 8½ | 2,500 |

Bodies B, C, and D were fired in the same manner as body A. The following are averages of tests performed upon samples of ceramic bodies having the above defined compositions A, B, C, and D, respectively.

TABLE II

| Comp. | Shrinkage, percent | Resistance (megohms) | Modulus of Rupture |
|---|---|---|---|
| A | 14.7 | .05–10 | 26,800 |
| B | 14.0 | .1–.2 | 21,100 |
| C | 13.9 | .3–1.0 | 20,100 |
| D | 14.7 | .15–.45 | 23,000 |

Percent linear firing shrinkage was determined from the "as-pressed-length" minus the fired length divided by the "as-pressed length" × 100.

Electrical resistance was determined by probing the surface of the ceramic body with the leads from an ohmmeter. The spacing between the probs was ¼ inch.

The modulus of rupture of the ceramic bodies was determined by applying a uniformly increasing load on the body until it ruptured or broke, and calculating the modulus of rupture from the formula:

$$\text{Modulus of Rupture} = \frac{3PL}{2bd^2}$$

where $P$=load in pounds to cause failure, pounds
$L$=span of ceramic body, inches
$b$=width of ceramic body, inches
$d$=depth of ceramic body, inches All of the bodies A, B, C, and D were very dense, having practically no porosity. A drop of ink placed on the upper surface of the bodies remained practically completely unabsorbed by the body. The negligible porosity of the ceramic bodies minimize fuel absorption by them when they are used in shunted-gap spark plugs, and prevents the absorption of the products of combustion.

Additionally, as shown by the high values for the modulus of rupture for each of the bodies, the bodies are mechanically strong. Mechanically strong materials are a virtual necessity for use as the gap-shunting member of a spark plug, in order that such member may successfully withstand assembly and operational wear and stresses, such as spark erosion and the like. Further, thermal shock resistance is directly related to the modulus of rupture values for a material, provided the coefficient of thermal conductivity is high, as is true of the ceramic bodies of the invention.

The ceramic bodies of the present invention display numerous outstanding advantages over prior art solid electrically semi-conductive ceramic bodies. Taking as an example prior art semi-conductive bodies made essentially of a mixture of $Al_2O_3$ and $SiC$, the semi-conductive bodies of the present invention display marked advantages by reason of their greatly increased mechanical strength and decreased porosity. Further, the bodies of the present invention yield more desirable electrical resistance properties for shunted gap applications than do $Al_2O_3$—$SiC$ bodies.

Although only a limited number of embodiments and modifications of the composition and ceramic body of the invention have been described in the foregoing specification, it is to be expressly understood that the invention is not limited to the specific embodiments disclosed.

What is claimed is:

1. An electrically semi-conductive fired ceramic body formed from a mixture consisting essentially of the following components: $Al_2O_3$ about 72.0%, wollastonite about 8.0%, $Cu_2O$ about 18.4%, and $Fe_2O_3$ about 1.6%, all percentages being by weight.

2. The method of forming an electrically semi-conductive ceramic body which comprises forming a mixture consisting essentially of the following components: $Al_2O_3$ from about 55 to 85%, CaO from about 1.45 to 5.8%, $SiO_2$ from about 1.55 to 6.2%, $Cu_2O$ from about 10 to 35%, and $Fe_2O_3$ from about 0.5 to 10.0%, all percentages being by weight, adding to such mixture water and a binder volatilizable by heat, milling the resulting batch, drying the milled batch, granulating the dried batch, dry-pressure molding the batch to shape the body, and firing the molded body.

3. The method of forming an electrically semi-conductive ceramic body which comprises forming a mixture consisting essentially of the following components: $Al_2O_3$ from about 55 to 85%, wollastonite from about 3.0 to 12.0%, $Cu_2O$ from about 10 to 35%, and $Fe_2O_3$ from about 0.5 to 10.0%, all percentages being by weight, adding to such mixture water and a binder volatilizable by heat, milling the resulting batch, drying the milled batch, granulating the dried batch, dry-pressure molding the batch to shape the body, and firing the molded body.

4. The method of forming an electrically semi-conductive ceramic body which comprises forming a mixture consisting essentially of the following components: $Al_2O_3$ from about 55 to 85%, wollastonite from about 3.0 to 12.0%, $Cu_2O$ from about 10 to 35%, and $Fe_2O_3$ from about 0.5 to 10.0%, all percentages being by weight, adding to such mixture water and a binder volatilizable by heat, milling the resulting batch, drying the milled batch, granulating the dried batch, dry-pressure molding the batch to shape the body, and firing the molded body to a final temperature on the order of 2400° F.

5. An electrically semi-conductive fired ceramic body formed from a mixture consisting essentially of the following components: $Al_2O_3$ from about 55 to 85%, CaO from about 1.5 to 6.0, $SiO_2$ from about 1.5 to 6.0, $Cu_2O$ from about 10 to 35%, and $Fe_2O_3$ from about 0.5 to 10.0%, all percentages being by weight.

6. An electrically semi-conductive fired ceramic body formed from a mixture consisting essentially of the following components: $Al_2O_3$ from about 55 to 85%, CaO from about 1.5 to 6.0%, $SiO_2$ from about 1.5 to 6.0%, the CaO and $SiO_2$ being supplied to the mixture in the form of wollastonite, $Cu_2O$ from about 10 to 35%, and $Fe_2O_3$ from about 0.5 to 10.0%, all percentages being by weight.

7. An electrically semi-conductive fired ceramic body formed from a mixture consisting essentially of the following components: $Al_2O_3$ about 72.0%, CaO about 3.85%, $SiO_2$ about 4.15%, $Cu_2O$ about 18.4%, and $Fe_2O_3$ about 1.6%, all percentages being by weight.

References Cited in the file of this patent

UNITED STATES PATENTS

| | | |
|---|---|---|
| 2,273,704 | Grisdale | Feb. 17, 1942 |
| 2,436,708 | Bonnett et al. | Feb. 24, 1948 |
| 2,494,276 | Austin et al. | Jan. 10, 1950 |
| 2,494,277 | Austin et al. | Jan. 10, 1950 |